United States Patent
Hermansen et al.

(10) Patent No.: US 9,656,524 B2
(45) Date of Patent: May 23, 2017

(54) TIRE LEVER

(75) Inventors: Frank Hermansen, Laguna Beach, CA (US); Carl Winefordner, Laguna Beach, CA (US)

(73) Assignee: CRANK BROTHERS, INC., Laguna Beach, CA (US)

( * ) Notice: Subject to any disclaimer, the term of this patent is extended or adjusted under 35 U.S.C. 154(b) by 1168 days.

(21) Appl. No.: 13/359,198

(22) Filed: Jan. 26, 2012

(65) Prior Publication Data

US 2013/0192767 A1    Aug. 1, 2013

(51) Int. Cl.
*B60C 25/00*    (2006.01)
*B60C 25/02*    (2006.01)
*B60C 25/04*    (2006.01)

(52) U.S. Cl.
CPC ............ *B60C 25/02* (2013.01); *B60C 25/04* (2013.01); *B60C 25/00* (2013.01)

(58) Field of Classification Search
CPC .......... B60C 25/00; B60C 25/02; B60C 25/04
USPC ........... 157/1.3, 1.17, 1.22, 1.49, 1; 81/3.55; 7/100
See application file for complete search history.

(56) References Cited

U.S. PATENT DOCUMENTS

| | | | | |
|---|---|---|---|---|
| 2,311,789 A * | 2/1943 | Taylor | B60C 25/02 | 157/1.3 |
| 3,100,011 A * | 8/1963 | Lydle | B60C 25/04 | 157/1.22 |
| 3,227,455 A * | 1/1966 | Hulsman | A63B 53/14 | 16/421 |
| 3,247,883 A * | 4/1966 | Strang | B60C 25/02 | 157/1.22 |
| 3,823,756 A * | 7/1974 | Rainey | | 157/1.3 |
| 3,918,509 A * | 11/1975 | Trotter | B60C 25/025 | 157/1.22 |
| 4,882,956 A * | 11/1989 | Lang | B25F 1/00 | 81/20 |
| 5,535,484 A * | 7/1996 | Gibson | A47J 45/10 | 16/430 |
| 5,606,772 A * | 3/1997 | Ilic | A01B 1/00 | 15/145 |
| 6,044,508 A * | 4/2000 | Chuang | B25B 27/0071 | 157/1.3 |
| 6,308,934 B1 * | 10/2001 | Gallo | B25C 11/00 | 254/21 |
| 6,527,033 B1 * | 3/2003 | Kliskey | B60C 25/02 | 157/1.17 |
| 6,578,223 B1 * | 6/2003 | Link | B67B 7/44 | 7/156 |

(Continued)

FOREIGN PATENT DOCUMENTS

| | | | | |
|---|---|---|---|---|
| WO | WO 9605974 A1 * | 2/1996 | | B60C 25/02 |
| WO | WO 2004096585 A2 * | 11/2004 | | B60C 25/02 |

*Primary Examiner* — Larry E Waggle, Jr.
*Assistant Examiner* — Danny Hong
(74) *Attorney, Agent, or Firm* — Haynes and Boone, LLP

(57) ABSTRACT

A unitary structure tire lever has an opening for the user to insert fingers and grab the lever when installing and removing a tire from a rim. The lever has a curved smooth installation hook at one end with a ridge to engage a lip of a tire rim during tire installation. The lever also has a curved smooth removal hook at the other end with a notch that enables the lever to pivot about the lip of the tire rim during tire removal. The removal hook also has a curved seat portion that engages with a bead of the tire during tire removal.

20 Claims, 7 Drawing Sheets

(56) References Cited

U.S. PATENT DOCUMENTS

| | | | | |
|---|---|---|---|---|
| 7,966,913 | B2 * | 6/2011 | Vollenweider | B25B 13/14 81/120 |
| 8,225,473 | B2 * | 7/2012 | Kliskey | B25B 27/10 157/1.33 |
| 8,695,458 | B2 * | 4/2014 | Jensen | B25D 1/16 157/1.3 |
| 2003/0182803 | A1 * | 10/2003 | Taylor | B25G 1/102 30/143 |
| 2004/0244545 | A1 * | 12/2004 | Stinnissen | B25D 1/04 81/489 |
| 2010/0051204 | A1 * | 3/2010 | Ochoa | B60C 25/04 157/1.3 |

* cited by examiner

TIRE LEVER

BACKGROUND

Field of the Invention

The present invention relates generally to the field of bicycle accessories and more particularly to the field of bicycle tire levers for removing and installing bicycle tires or the tubes thereof.

Related Art

Bicycle tire levers are typically made in the same way, namely a three pack of about 4.5 inch×0.6 inch×0.3 inch plastic pieces with a removal hook at one end for prying under the bead of the tire and a notch at the other end for catching under a spoke.

One prior art bicycle tire lever has both a removal hook and an installation hook on one end, and telescopes to an extended length in order to attach the opposite end onto the axle of the wheel hub. This hub attachment helps to guide one end of the tire lever, while the user pushes the other end around the rim to either remove or install a tire.

At the time of this telescoping tire lever invention, virtually all front and rear bicycle hubs had a relatively similar 9 mm diameter axle for the front and 10 mm diameter for the rear, which made it straight forward to connect the tire lever to the axle. However, in the past few years, several new axle standards have emerged, particularly in mountain bikes. For example, for the front, there are now three common axle standards: 9 mm standard, 15 mm thru, and 20 mm thru. "Thru" means that there is a separate axle that passes through the hub, and the axle is removed prior to removing the wheel from the bicycle frame or fork, and normally this axle is not installed in the hub during a tire change. For the rear, there is 10 mm standard and 12 mm thru. The current telescoping tire lever cannot accommodate these large differences in axle sizes and styles, particularly the front. If not connected to the axle, it is difficult to push the current telescoping tire lever along the rim without the removal hook slipping out from under the tire bead, which can result in skinned knuckles from hitting the spokes of the wheel.

The reasons for needing to remove and install tires are well known. The two most difficult and often most time consuming steps of changing a tube or tire are prying the bead off the rim and then pushing the bead back onto the rim. The telescoping tire lever works well for wheels with the old standard axle sizes, but not with the more recent larger axle sizes and styles. Furthermore, by having both the installation and removal hooks on the same end of the lever, the hooks cannot be optimally shaped to fit along the wheel rim. For example, when installing a tire, the removal hook interferes with the tire side wall, and on certain tires, interferes with the tread of the tire. Additionally, only a narrow range of polymers can mold (and remain) straight enough in order for the injection molded telescoping tire lever components to correctly slide against each other. Some materials, such as unfilled Nylon, are slippery and strong, yet unfilled Nylon does not mold very straight and it changes dimensions as it absorbs moisture, jamming the telescoping action. This limits the material choices to ones that mold very straight, but are not optimal for wear, friction, strength, and cost.

Therefore, a need exits for a tire lever that overcomes the disadvantages described above.

SUMMARY

In one embodiment of the present invention, a tire lever has a removal hook on one end and an installation hook on the other end. The removal hook has a notch that becomes a pivot while hooking the tire bead and then helps keep the lever secured to the rim while sliding the lever along the rim. The installation hook is on the opposing side of the removal hook and includes a ridge that engages an inner portion of the rim during tire removal. Additionally, the lever has a guard that protects fingers from painfully colliding with the wheel spokes. In one embodiment, the lever is unitary and a wide variety of material choices are possible to optimize wear, frication, strength, and/or cost.

To install a tire, the user simply holds the level with the guard closest to the rim, places the installation hook into one side of a rim wall (with the outer part of the hook engaged against the tire), and slides the lever around the rim. To remove the tire, the user slides the removal hook between the tire and rim, pulls the lever toward the hub position the notch against the rim and the hook against the inner surface of the tire to disengage the tire, and slides the lever around and engaged with the rim.

As a result, the user can easily remove and install a tire from and to a bicycle wheel rim. Specifically, the lever is designed to reliably slide along a rim for both tire installation and removal without the need of connecting an end to the axle of the wheel hub. In this way, the lever can be used without regard to the hub axle size or type, or wheel size.

This tire lever is as fast and easy to use as the telescoping lever, but also works with all bicycle tires and rims independent of the wheel size and hub axle size and type.

These and other features and advantages of the present invention will be more readily apparent from the detailed description of the embodiments set forth below taken in conjunction with the accompanying drawings.

Figure 1:
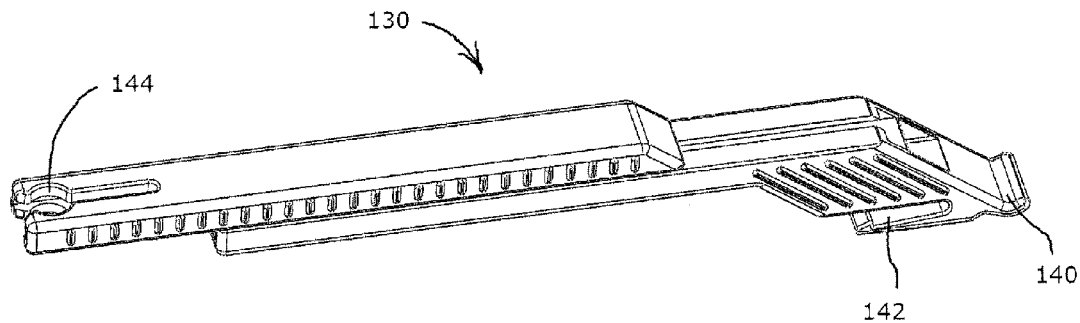
FIG. 1 is a perspective view of a conventional telescoping tire lever for removing a bicycle tire from a wheel.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 shows a conventional telescoping tire lever 130 that has a removal hook 140 on one end, an installation hook 142 on the same end, and a snap ring 144 on the opposite end for engaging a hub axle. Tire lever 130 can be telescopically extended so that snap ring 144 snaps onto a hub axle of a fairly narrow range of sizes, such as a 9 mm diameter front and 10 mm diameter rear, for rims of different sizes. U.S. Pat. No. 5,857,509 describes a similar telescoping bicycle tire lever. One disadvantage of such a tire lever is that snap ring 144 can only be used to engage axles of a very limited range of diameters. This can be problematic as bicycle rims now have different size axle diameters.

Figure 2:
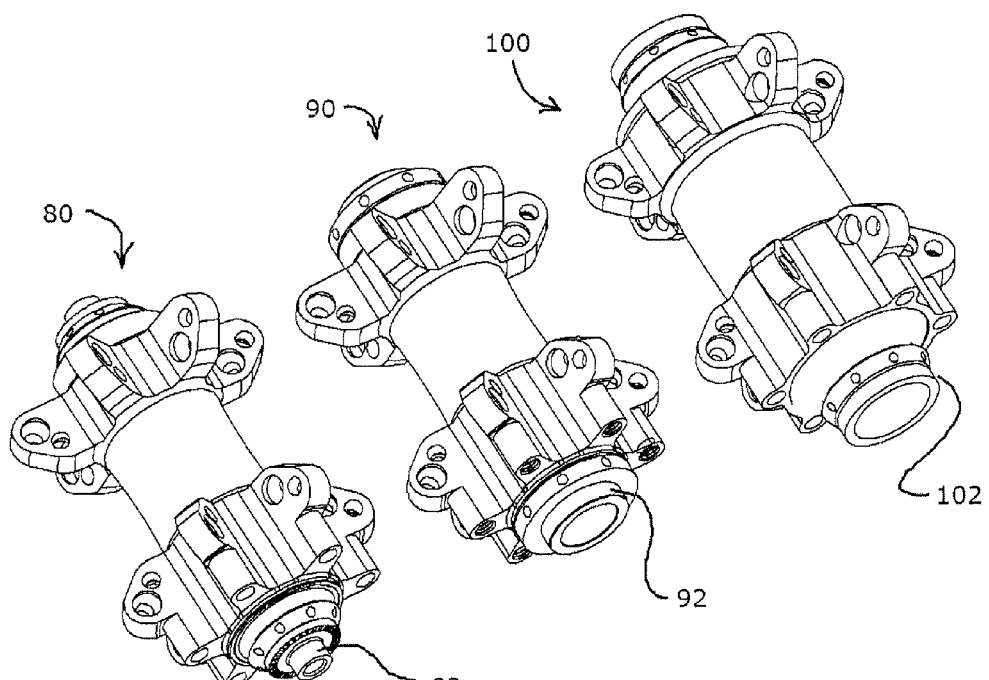
FIG. 2 are perspective views of three wheel hubs that have different axle sizes and types.

FIG. 2 shows three different front hubs 80, 90, 100, each having a different axle diameter. Front hub 80, which has the original standard 9 mm axle, is suitable for use with tire lever 130 of FIG. 1. However, newer hub 90 that uses a 15 mm diameter thru axle (axle not shown), and newer hub 100 that uses a 20 mm diameter thru axle (axle not shown) have significantly larger axle diameters, and thus, the conventional tire lever of FIG. 1 cannot be used to install and remove tires from rims with such hubs. These newer hubs are becoming increasingly common because they add significant stiffness to the fork or frame of the bicycle. Thus, the consumer may need to purchase different tire levers with these newer hubs because tire lever 130 cannot snap onto hubs 90 and 100 with the fixed smaller sized snap ring 144.

Figure 3:
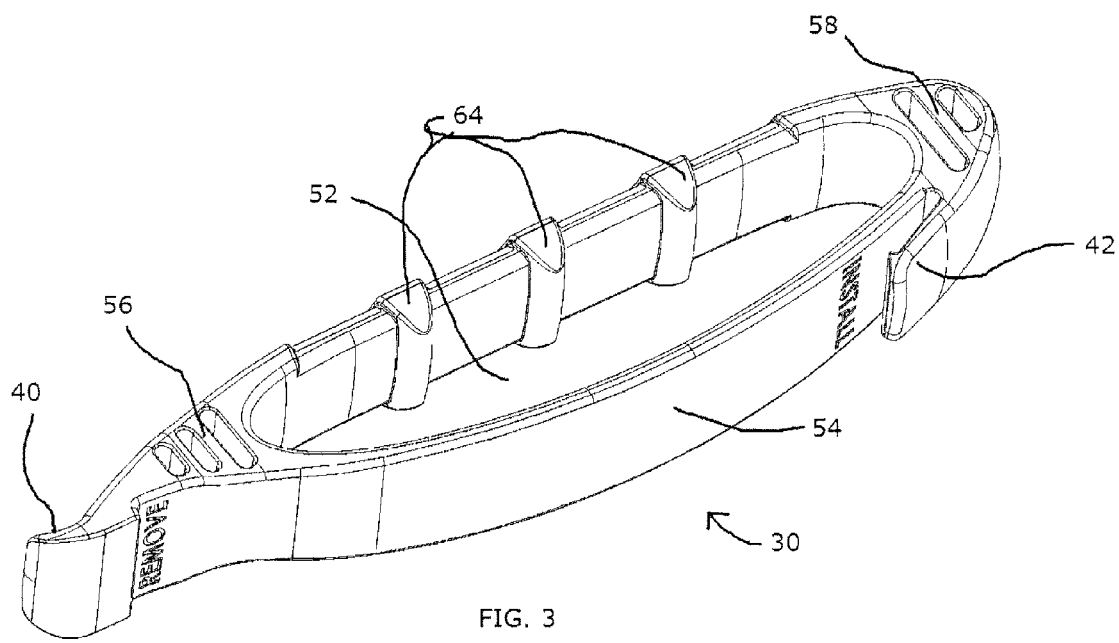
FIG. 3 is a perspective of tire lever according to one embodiment of the present invention.

FIG. 3 shows a tire lever 30, according to one embodiment of the present invention. Tire lever 30 has a removal hook 40 on one end, an installation hook 42 on the opposite end, an opening 52 for fingers, a finger guard 54, and removal thumb placement surface 56 and installation thumb surface 58. Surfaces 56 and 58 may have openings, ridges, bumps, or others be textured so that the user's thumb is less likely to slip when using tire lever 30 to install and/or remove a tire. Removal hook 40 and installation hook 42 are located on opposing sides of tire lever 30. Optional contours 64 provide comfortable separation between fingers.

Figure 4:
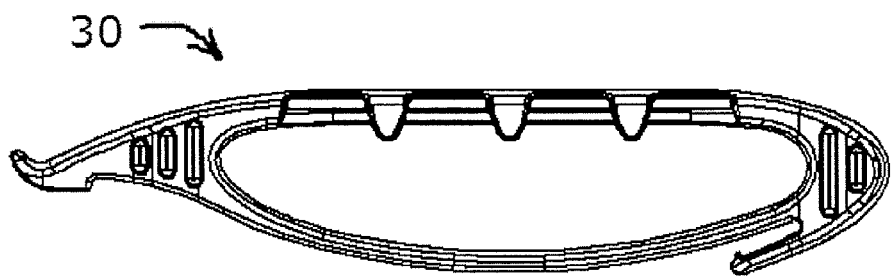
FIG. 4 is a side view of the tire lever of FIG. 3.
Figure 5:
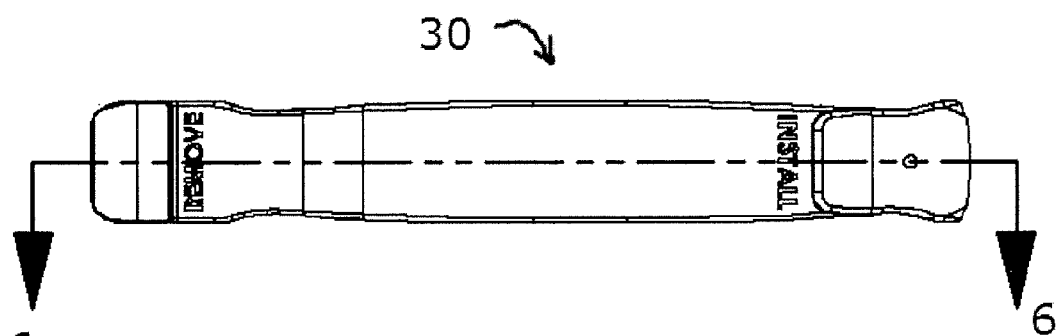
FIG. 5 is a bottom view of the tire lever of FIG. 3.
Figure 6:
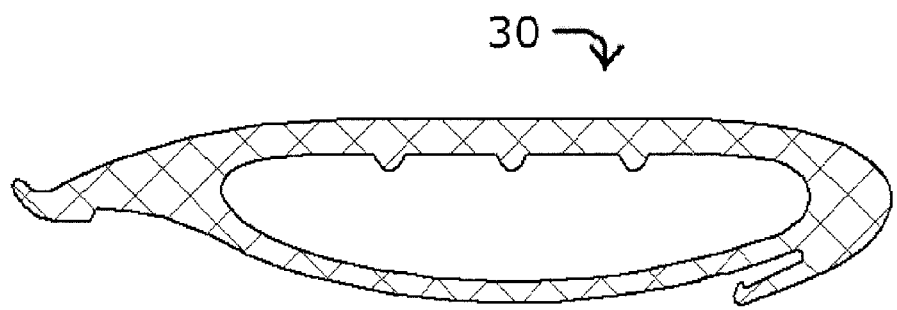
FIG. 6 is a sectional view through lines 6-6 of FIG. 5.

FIGS. 4, 5, and 6 are side, bottom, and section views, respectively, of tire lever 30. Note that the "bottom" of tire lever 30 is defined herein as the side facing away from the user's palm when the user is holding the lever. As seen from FIGS. 3-7, installation hook 42 has a ridge 43 at near the end of the hook that can be used to engage an inner surface or lip of a tire rim when installing a tire. In one embodiment, the length of the hook should be such that full height of the rim can fit between the hook and the body of tire lever 30 when installing the tire.

Installation hook 42 also has a curved portion 44 that presses against the tire during installation. In one embodiment, curved portion 44 is smooth so that the tire is not damaged during installation when the portion is moved against the tire and so that the user can more easily slide tire lever 30 along the tire during installation.

Removal hook 40, in one embodiment, has a notch 62 at a bottom portion of the hook and a seat 47 on the opposite side. Notch 62 pivots against an edge of the rim during tire removal, and seat 47 engages against a bead or end of the tire during tire removal. As such notch 62 and seat 47, in one embodiment, are smooth so that the user can more easily slide tire lever around the rim during removal and not damage the tire during tire removal.

Figure 7:
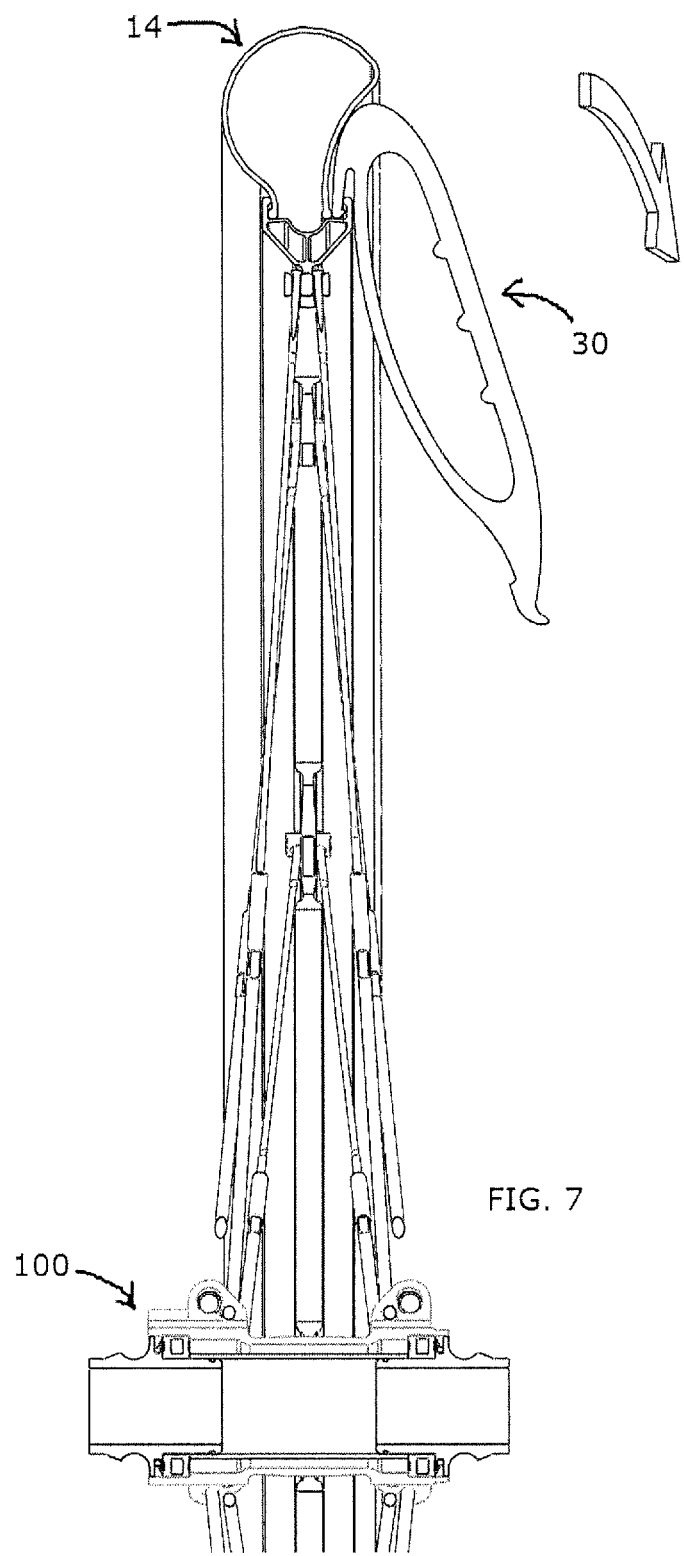
FIG. 7 is a sectional view of a partial bicycle wheel, where the tire lever of FIG. 3 is used to install a tire on the wheel.
Figure 8:
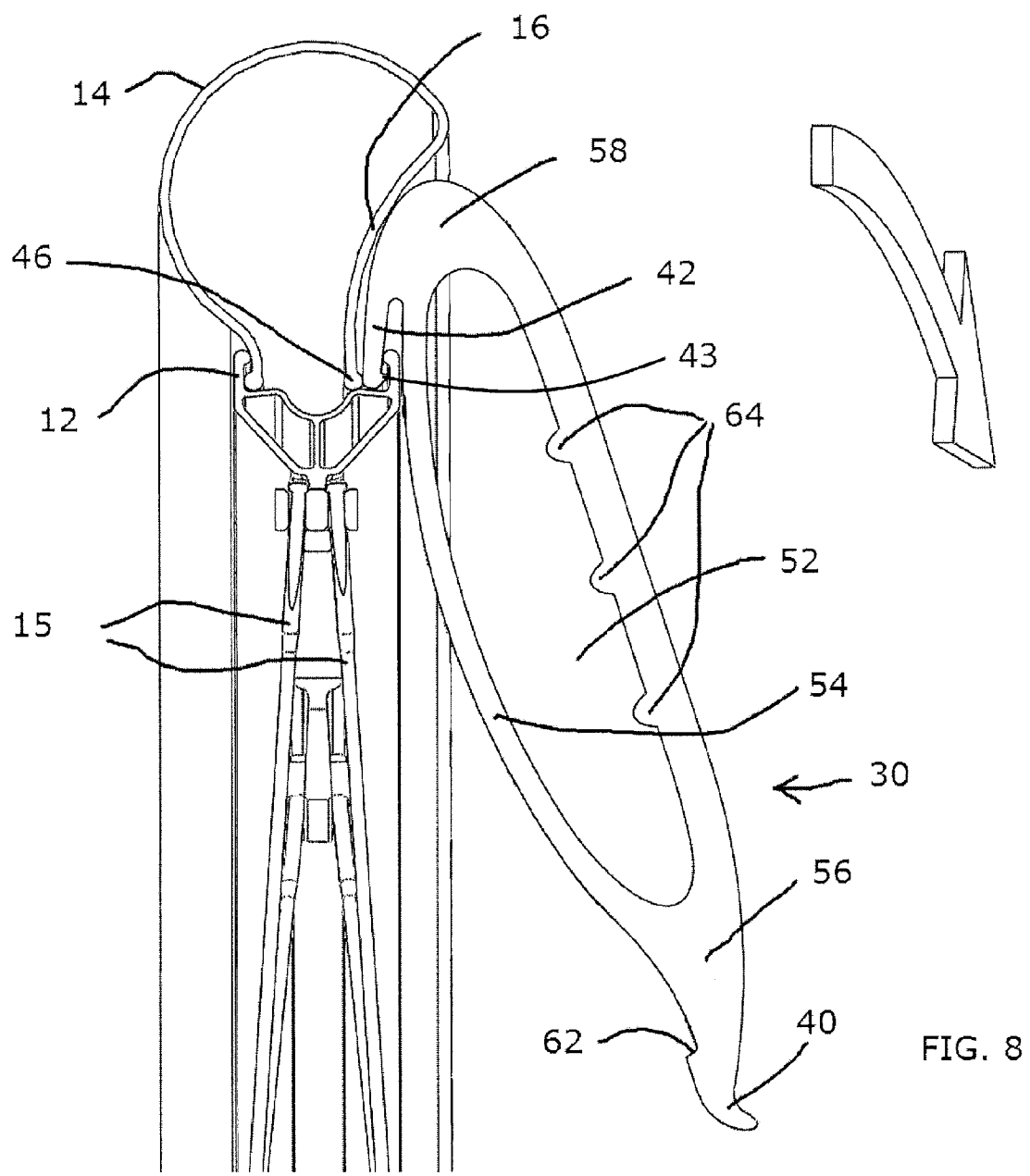
FIG. 8 is a close up view of the installation process shown in FIG. 7;.

FIGS. 7 and 8 show a partial portion of a bicycle wheel having a rim 12 and a tire 14, where tire lever 30 is used to install tire 14 onto the wheel. As seen from FIG. 7, the wheel has a hub 100 that is separated from tire lever 30, in contrast to tire lever 130 in which the tire lever 130 extends from hub 100 to the end of rim 12. Thus, tire lever 30 is much more compact than tire lever 130. Note that hub 100 uses a 20 mm thru axle, which the prior art lever 130 does not fit.

FIG. 8 shows an enlarged view of FIG. 7. One side of tire 14 is first fitted into one side of rim 12 where spokes 15 are attached so that a bead 46 of tire 14 engages within the opening of rim 12. The user may then insert the user's fingers through opening 52 and place installation hook 42 between the other side of tire 14 and the other side of rim 12. The user can snap onto rim 12 by pressing installation hook 42 and curved portion 44 against tire 16 and engaging the opening of installation 42 into the top portion of rim 12. Thus, engaged, tire lever 30 is placed between tire 14 and rim 12. A sidewall 16 of tire 14 and bead 46 are pushed inwards by installation hook 42. As tire lever 30 is moved (e.g., pushed) along rim 12 in direction of the arrow shown, tire bead 46 is installed into rim 12. A user's fingers (not shown) hold tire lever 30 through opening 52, with the user's thumb pressed against installation thumb surface 58 to enable the user to more easily push tire lever around rim 12. Finger guard 54 prevents fingers from impacting spokes 15. Note that removal hook 40 does not interfere with tire 14 during installation as occurs with prior art telescoping lever 130. Installation hook 42 tends to stay in proper position during the installation process even without being connected to the hub because installation hook 42 is firmly hooked onto rim 12 due in part to ridge 43 engaging with a corresponding lip of rim 12.

Figure 9:
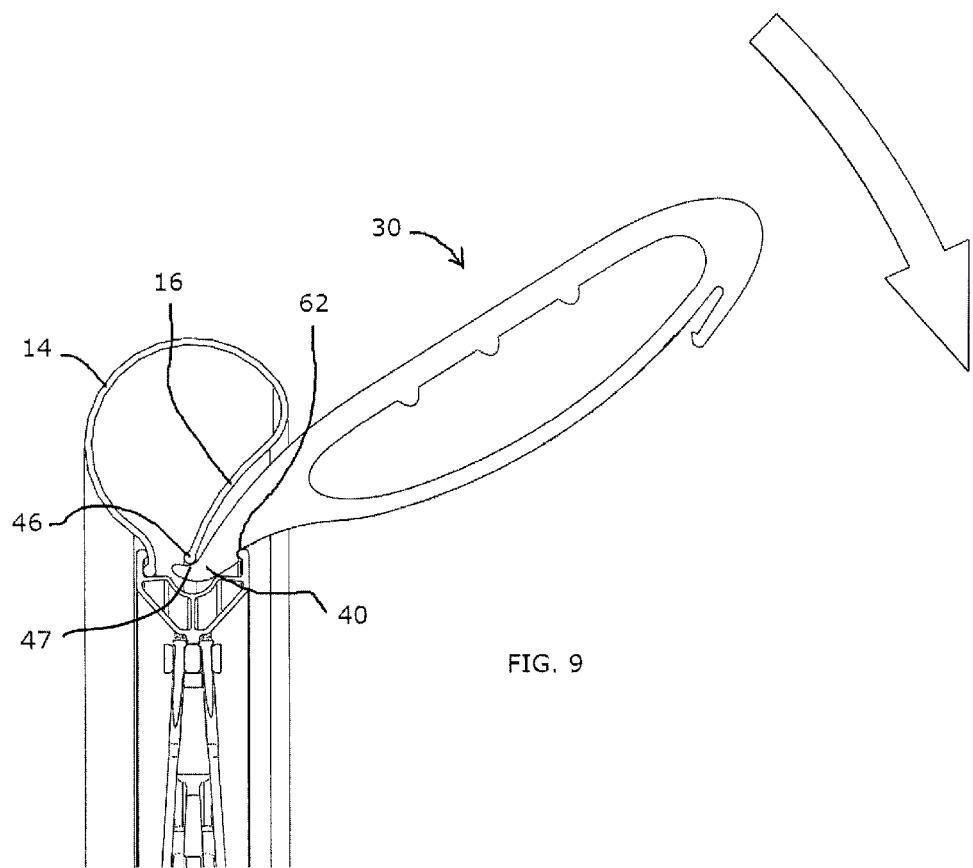
FIG. 9 is a sectional view of a partial bicycle wheel, where the tire lever of FIG. 3 is used during a first step to remove the tire from the wheel.
Figure 10:
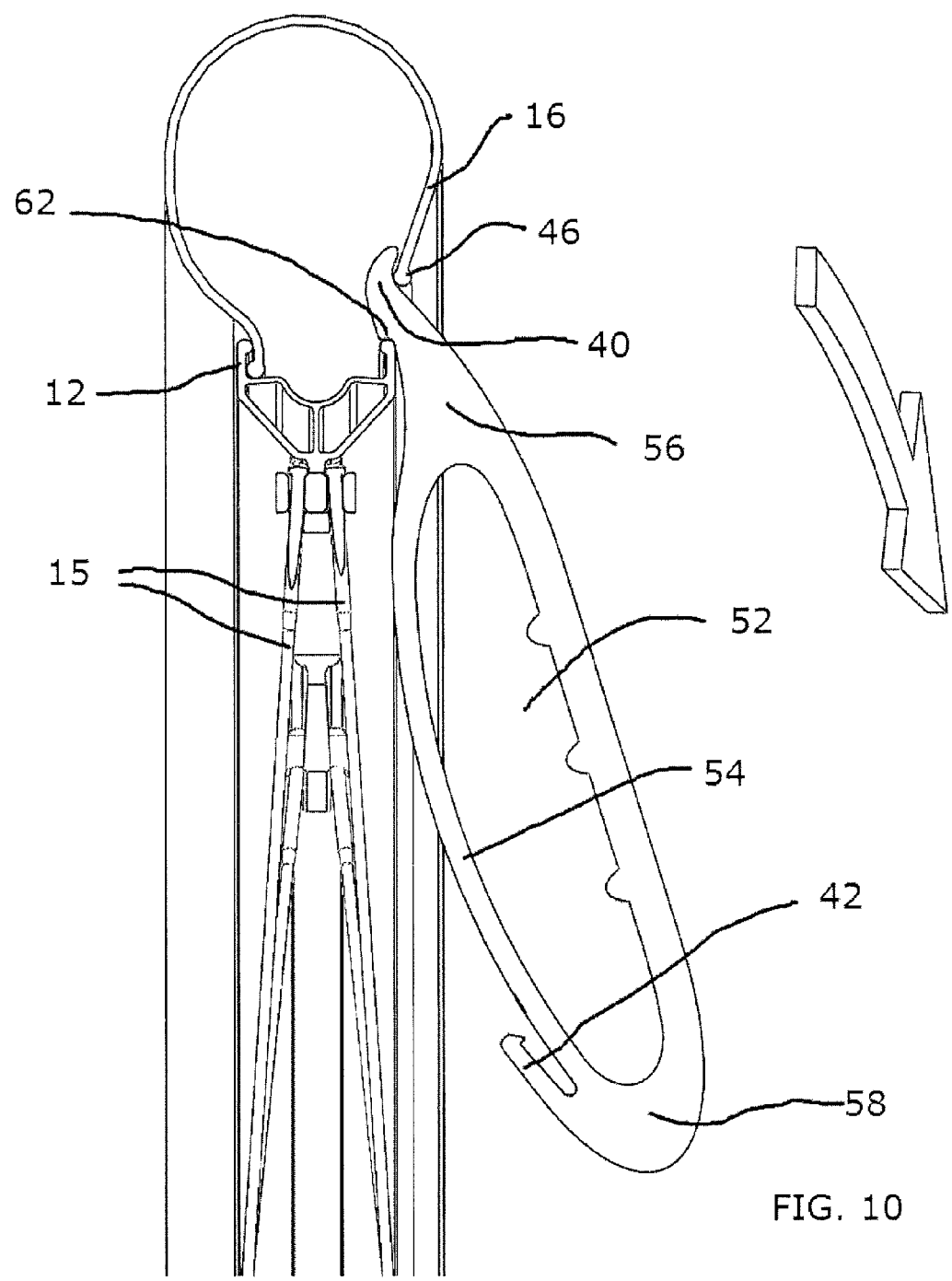
FIG. 10 is a sectional view of a partial bicycle wheel, where the tire lever of FIG. 3 is used during a second step to remove the tire from the wheel.

FIGS. 9 and 10 show a partial portion of a bicycle wheel having rim 12, tire 14, and spokes 15, where tire lever 30 is used to remove tire 14 from the wheel. As seen from FIG. 9, the user inserts removal hook 40 between one side wall 16 of tire 14 and rim 12. The front or end of the hook is used to initially move sidewall 16 of tire 14 away from the inner sidewall of rim 12. Tire lever 30 is further inserted so that tire bead 46 engages with seat 47 and notch 62 engages with a lip portion of rim 12. Notch 62 helps keep tire lever 30 from inadvertently slipping out of position. As tire lever 30 is pivoted downwards in the direction of the arrow, i.e., towards the hub or axle, along notch 62, tire bead 46 is moved up and over rim 12, as seen in FIG. 10.

FIG. 10 shows tire lever 30 is positioned and ready to remove tire 14 after the user has pivoted tire lever 30 toward rim 12. As can be seen, forger guard 54 is close to or abuts against rim 12/spokes 15 and protects the user's fingers during the tire removal process. As tire lever 30 is pushed along rim 12 in the direction of the arrow, tire bead 46 is pulled off rim 12. Fingers (not shown) hold tire lever 30 through opening 52 and the user's thumb pressed against removal thumb surface 56, which provides leverage to push tire lever 30 along rim 12. Note that installation hook 42 does not interfere with rim 12 during removal as occurs with prior art telescoping lever 130. When tire 14 is tight against rim 12, bead 46 pushes against removal hook 40 which holds notch 62 firmly against rim 12 and prevents tire lever 30 from inadvertently slipping out of position.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. It will now be understood that what has been disclosed herein comprises a one embodiment of a tire lever which is especially useful for removing and installing bicycle tires. However, the invention is also readily configured for removing any tire mounted on a wheel such as motorcycle tires. Thus, the present disclosure is limited only by the claims.

What is claimed is:

1. A tire lever comprising:
    a body having a first side, a second side joining the first side at a first end of the body and at a second end of the body opposite the first end, and a through opening between the first side and the second side, the first side including contours configured to engage a user's fingers;
    a first hook located at the first end of the body for removing a tire, the first hook extending away from the second end;
    a second hook on the second side at the second end of the body for installing a tire, the second hook extending away from the second end, wherein the second hook comprises a ridge facing the second side configured to engage a rim of the tire and a curved portion configured to press against the tire, and wherein the second hook and the body are configured to receive a full height of the rim between the second hook and the body of the tire lever such that the ridge of the second hook engages one side of the rim and the body engages an opposing side of the rim; and
    a notch in the second side of the body opposite the first hook.

2. The tire lever of claim 1, wherein the first hook comprises a seat configured to engage a bead of the tire during tire removal.

3. The tire lever of claim 1, wherein the ridge is at the end of the second hook and configured to engage a lip of the rim.

4. The tire lever of claim 1, wherein the body further comprises a first thumb portion between the opening and the first hook configured to engage a user's thumb when using the tire lever to remove a tire.

5. The tire lever of claim 4, wherein the first thumb portion is not a smooth surface.

6. The tire lever of claim 1, wherein the body further comprises a second thumb portion between the opening and the second hook configured to engage a user's thumb when using the tire lever to install a tire.

7. The tire lever of claim 6, wherein the second thumb portion is not a smooth surface.

8. The tire lever of claim 1, wherein the curved portion comprises a smooth outer surface of the second hook.

9. The tire lever of claim 1, wherein the body is substantially oval-shaped.

10. The tire lever of claim 1, wherein the tire lever is a unitary structure.

11. A tire lever comprising:
    a body having a first side, a second side, and a through opening between the first side and the second side, the first side including contours configured to engage a user's fingers;
    a first hook located at a first end of the body for removing a tire, the first hook extending away from a second end of the body opposite the first end; and
    a second hook on the second side and at the second end for installing a tire, the second hook extending away from the second end, wherein the second hook comprises a ridge facing the second side configured to engage a rim of the tire and a curved portion configured to press against the tire, and wherein the second hook and the body are configured to receive a full height of the rim between the second hook and the body of the tire lever such that the ridge of the second hook engages one side of the rim and the body engages an opposing side of the rim.

12. The tire lever of claim 11, further comprising a notch in the second side of the body opposite the first hook.

13. The tire lever of claim 11, wherein the first hook comprises a seat configured to engage a bead of the tire during tire removal.

14. The tire lever of claim 11, wherein the ridge is at the end of the second hook and configured to engage a lip of the rim.

15. The tire lever of claim 11, wherein the body further comprises a first thumb portion between the opening and the first hook configured to engage a user's thumb when using the tire lever to remove a tire.

16. The tire lever of claim 11, wherein the body further comprises a second thumb portion between the opening and the second hook configured to engage a user's thumb when using the tire lever to install a tire.

17. The tire lever of claim 11, wherein the curved portion comprises a smooth outer surface of the second hook.

18. The tire lever of claim 11, wherein the body is substantially oval-shaped.

19. The tire lever of claim 11, wherein the tire lever is a unitary structure.

20. The tire lever of claim 1, wherein the contours include one or more protrusions within the through opening extending toward the second side.

* * * * *

UNITED STATES PATENT AND TRADEMARK OFFICE
CERTIFICATE OF CORRECTION

Page 1 of 1

PATENT NO. : 9,656,524 B2
APPLICATION NO. : 13/359198
DATED : May 23, 2017
INVENTOR(S) : Frank Hermansen and Carl Winefordner It is certified that error appears in the above-identified patent and that said Letters Patent is hereby corrected as shown below:

In the Detailed Description:

In Column 4, Line 42, change "As can be seen, forger guard 54" to --As can be seen, finger guard 54--.

Signed and Sealed this
Eighth Day of May, 2018

Andrei Iancu
*Director of the United States Patent and Trademark Office*